United States Patent
Minakawa

(10) Patent No.: US 9,807,584 B2
(45) Date of Patent: Oct. 31, 2017

(54) COMMUNICATION APPARATUS, CONTROL METHOD, AND STORAGE MEDIUM

(71) Applicant: CANON KABUSHIKI KAISHA, Tokyo (JP)

(72) Inventor: Atsushi Minakawa, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 23 days.

(21) Appl. No.: 14/710,921

(22) Filed: May 13, 2015

(65) Prior Publication Data
US 2015/0334581 A1   Nov. 19, 2015

(30) Foreign Application Priority Data
May 16, 2014   (JP) .................................. 2014-102730

(51) Int. Cl.
*H04W 40/24*   (2009.01)
*H04W 8/00*   (2009.01)

(52) U.S. Cl.
CPC ........... *H04W 8/005* (2013.01); *H04W 40/24* (2013.01)

(58) Field of Classification Search
CPC ..... H04W 84/18; H04W 84/20; H04W 8/005; H04W 12/04; H04W 36/14; H04W 48/10; H04W 4/008; H04W 52/0229; H04W 52/0251; H04W 52/028; H04W 74/002; H04W 76/023; H04W 76/045; H04W 76/066

See application file for complete search history.

(56) References Cited

U.S. PATENT DOCUMENTS

| | | | |
|---|---|---|---|
| 2008/0299909 A1 | 12/2008 | Sakai | |
| 2010/0245931 A1* | 9/2010 | Sato | H04N 1/00315 358/407 |
| 2011/0029680 A1* | 2/2011 | Goto | H04W 84/20 709/228 |

(Continued)

FOREIGN PATENT DOCUMENTS

| | | |
|---|---|---|
| JP | 2010-278536 A | 12/2010 |
| KR | 1020140042465 A | 4/2014 |
| WO | 2009/017036 A1 | 2/2009 |

OTHER PUBLICATIONS

European Search Report issued in corresponding application No. EP15001295.3 dated Oct. 23, 2015.

(Continued)

*Primary Examiner* — Khaled Kassim
*Assistant Examiner* — Zhaohui Yang
(74) *Attorney, Agent, or Firm* — Carter, Deluca, Farrell & Schmidt, LLP

(57) ABSTRACT

In the case of receiving a first signal from another communication apparatus after starting operation as an access point, a communication apparatus provides a communication parameter to the other communication apparatus, and in the case of receiving a communication parameter provision request from another communication apparatus from when starting the operation as the access point and until the elapse of a predetermined time, the communication apparatus provides a communication parameter to the other communication apparatus even in the case where the first signal is not received from the other communication apparatus.

13 Claims, 9 Drawing Sheets

(56) References Cited

U.S. PATENT DOCUMENTS

| | | | |
|---|---|---|---|
| 2011/0032918 A1* | 2/2011 | Sakai | H04W 74/002 |
| | | | 370/338 |
| 2011/0142241 A1* | 6/2011 | Goto | H04W 12/04 |
| | | | 380/279 |
| 2013/0036231 A1 | 2/2013 | Suumäki | |
| 2013/0044635 A1* | 2/2013 | Suzuki | H04W 76/023 |
| | | | 370/254 |
| 2014/0029601 A1 | 1/2014 | Yee | |
| 2014/0092425 A1* | 4/2014 | Park | G06F 3/1292 |
| | | | 358/1.15 |
| 2014/0206346 A1* | 7/2014 | Kiukkonen | H04W 52/0229 |
| | | | 455/426.1 |
| 2015/0031404 A1* | 1/2015 | Yada | H04W 76/045 |
| | | | 455/508 |

OTHER PUBLICATIONS

Korean Office Action dated Mar. 18, 2017 in corresponding Korean Patent Application No. 10-2015-0064309, with English translation, 11 pages.

* cited by examiner

FIG. 5

COMMUNICATION APPARATUS, CONTROL METHOD, AND STORAGE MEDIUM

BACKGROUND OF THE INVENTION

Field of the Invention

The present invention relates to a method for providing a communication parameter using a communication apparatus.

Description of the Related Art

In recent years, wireless LAN (local area network) functions have been increasingly included in devices such as personal computers (PCs), mobile phones, digital cameras, and printers. In general, a base station (an access point) is required for communication in an infrastructure mode via wireless LAN. Meanwhile, in recent years, a technique has been proposed according to which communication is realized between terminals in the infrastructure mode even in an environment where no base station is present, due to a simple base station function being included in the terminals. With regard to this technique, Wi-Fi Alliance, which is the business association for the wireless LAN, has standardized Wi-Fi Direct as a specification for realizing direct communication between terminals using a terminal that includes the simple base station function.

With Wi-Fi Direct, a device that operates as the simple base station is defined as a P2P (Peer-to-Peer) GO (Group Owner), and a terminal device that is to be connected to the P2P GO is defined as a P2P Client. Capability information that is referred to as an "intent value" is exchanged among the devices so as to determine which device is to operate as the P2P GO, and which device operates as the P2P Client. Also, it is also possible for a given device to necessarily operate as the P2P GO without exchanging intent values with another device. Such a P2P GO is referred to as an "Autonomous GO".

The device that has been defined as the P2P GO activates the simple base station function and forms a wireless network. The P2P Client executes communication parameter setting for the wireless LAN using later-described WPS (Wi-Fi Protected Setup) so as to automatically connect to the wireless network formed by the P2P GO. Accordingly, the P2P GO and the P2P Client form a wireless LAN network called a P2P group, and in the P2P group, direct communication between the P2P GO and the P2P Client is possible via the wireless LAN.

Here, the above-described WPS is a standard technique of the wireless LAN for easily performing setup of communication parameters such as security settings and the like required for wireless LAN connection and for allowing a communication apparatus to participate in an infrastructure network. With WPS, an enrollee, which is a communication parameter receiving apparatus that wishes to connect to the wireless LAN network, acquires a communication parameter required for the wireless LAN connection from a communication parameter provision apparatus called a registrar. Also, examples of WPS include a PBC (Push Button Configuration) method in which buttons are pressed in both devices and a PIN method in which a predetermined PIN code is set in both devices to set communication parameters between the devices whose PIN codes match.

With Wi-Fi Direct, the P2P GO having the simple base station is a registrar and the P2P Client is an enrollee. The P2P Client transmits a provision discovery request that includes information and the like that are compatible with the PIN method or the PBC method to the P2P GO in order to request communication parameter provision using WPS.

Upon receiving the provision discovery request, the P2P GO starts operation as the registrar, and starts processing for providing the communication parameter using WPS. Therefore, a user is not requested to perform an instruction operation for starting the registrar operation on the communication apparatus that has been defined as the P2P GO.

On the other hand, a case will be described in which a given partner apparatus connects to a communication apparatus that is the P2P GO in the PBC method of WPS. In such a case, it is necessary for the communication apparatus to operate as the registrar so that the partner apparatus acquires a communication parameter using the PBC method. However, unlike the Wi-Fi Direct method, with the PBC method, the partner apparatus does not transmit a provision discovery request, and therefore, a user is requested to perform an instruction operation so that the communication apparatus activates the function as the registrar. In this case, for example, the user needs to perform an instruction operation such as pressing a WPS button of the communication apparatus, or the like.

In contrast, Japanese Patent Laid-Open No. 2010-278536 describes an apparatus that, in response to a power source being switched on, starts operation as the registrar for providing a communication parameter using the PBC method without receiving a command from the outside, such as a user operation or the like.

However, Japanese Patent Laid-Open No. 2010-278536 does not describe a case in which the communication parameter request is received from a partner apparatus for communication using the Wi-Fi Direct method. Therefore, taking the case of the Wi-Fi Direct method into consideration, there has been an issue in that the user of the communication apparatus needs to recognize whether the communication apparatus has received the request using the Wi-Fi Direct or using the PBC method. Also, with the apparatus described in Japanese Patent Laid-Open No. 2010-278536, communication parameter provision processing after the operation as the registrar has stopped is not described. Therefore, there has been an issue in that in order to request the communication parameter provision processing after the operation as the registrar has stopped, the user needs to perform an instruction operation after all.

The present invention has been made in view of the above-described issues, and provides a technique according to which a communication apparatus can easily execute provision of a communication parameter regardless of the format of a communication parameter request from a partner apparatus.

SUMMARY OF THE INVENTION

According to one aspect of the present invention, there is provided a communication apparatus, comprising: a starting unit configured to start operation as an access point in response to accepting an instruction for starting communication processing using a wireless network; and a providing unit configured to, in a case where a first signal is received from another communication apparatus after the operation as the access point is started by the starting unit, provide a communication parameter to the other communication apparatus, and in a case where a communication parameter provision request is received from another communication apparatus from when the operation as the access point is started and until elapse of a predetermined time, provide the communication parameter to the other communication apparatus even in a case where the first signal is not received from the other communication apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a sequence diagram showing a second example of a flow of processing in the wireless communication network.

DESCRIPTION OF THE EMBODIMENTS

An exemplary embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Hereinafter, although an example in which a wireless LAN system that conforms to IEEE 802.11 series is used will be described, the present invention is not necessarily limited to this.

Configuration of Wireless Communication Network

Figure 1:
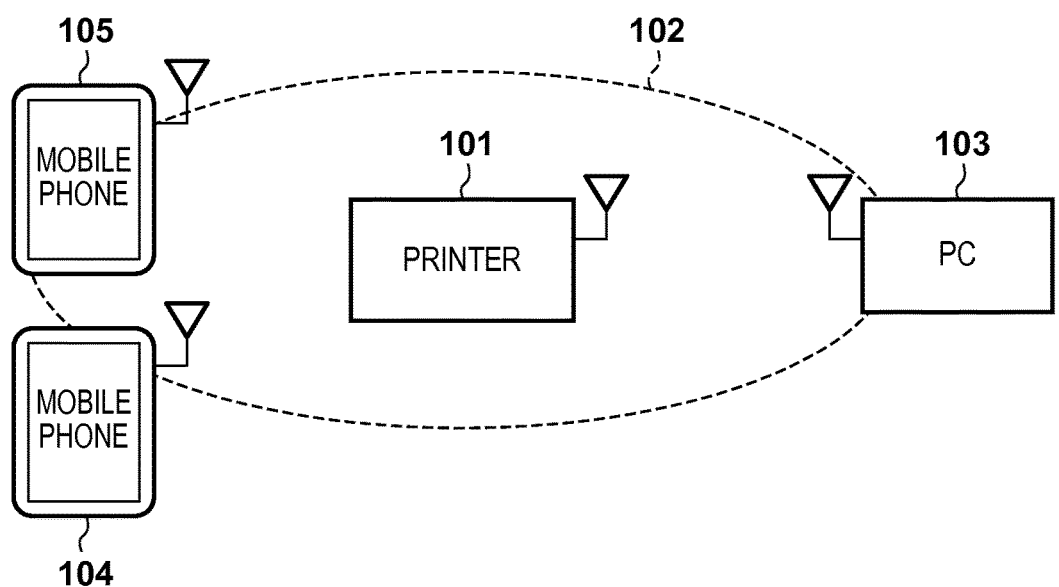
FIG. 1 is a diagram showing a configuration example of a wireless communication network.

FIG. 1 shows a configuration example of a wireless communication network according to this embodiment. The wireless communication network, for example, includes a printer 101, a personal computer (PC) 103, and mobile phones 104 and 105, all of which function as communication apparatuses. Hereinafter, a case in which at least one of the PC 103, and the mobile phones 104 and 105 connects to the printer 101 will be described. Also, hereinafter, although description will be given assuming that the printer 101, the PC 103, and the mobile phones 104 and 105 have a wireless LAN function that conforms to IEEE 802.11 standard series, they may have another wireless communication function.

It is assumed that the printer 101 and the mobile phones 104 and 105 have a Wi-Fi Direct function, and can handle communication processing based on a Wi-Fi Direct protocol.

The printer 101 uses the Wi-Fi Direct function to form a wireless network (P2P group) 102 as a Peer-to-Peer (P2P) Group Owner (GO). It should be noted that the P2P GO is a role of operating as a base station (access point, AP) in Wi-Fi Direct. In contrast, in Wi-Fi Direct, a role of operating as a terminal (station, STA) is referred to as "P2P Client". The mobile phones 104 and 105, for example, operate as P2P Clients.

Also, the printer 101 uses the Wi-Fi Direct function to execute processing for providing the communication parameter in response to reception of the communication parameter provision request from a partner apparatus connected to the wireless network (P2P group) 102. Here, the communication parameter is a setting item necessary for performing wireless communication, and includes at least one of a SSID, an encryption method, an encryption key, an authentication method, and an authentication key as a network identifier, for example. The mobile phones 104 and 105 can receive the communication parameter from the printer 101 through the wireless network (P2P group) 102 according to this provision processing, for example.

It is assumed that the PC 103 has the wireless LAN function, but cannot receive provision of the communication parameter using Wi-Fi Direct due to a reason such as not having the Wi-Fi Direct function or this function is inactivated. Thus, the PC 103 receives the communication parameter from the printer 101 through the wireless network 102 using the PBC method of WPS.

Configuration Example of Printer

Figure 2:
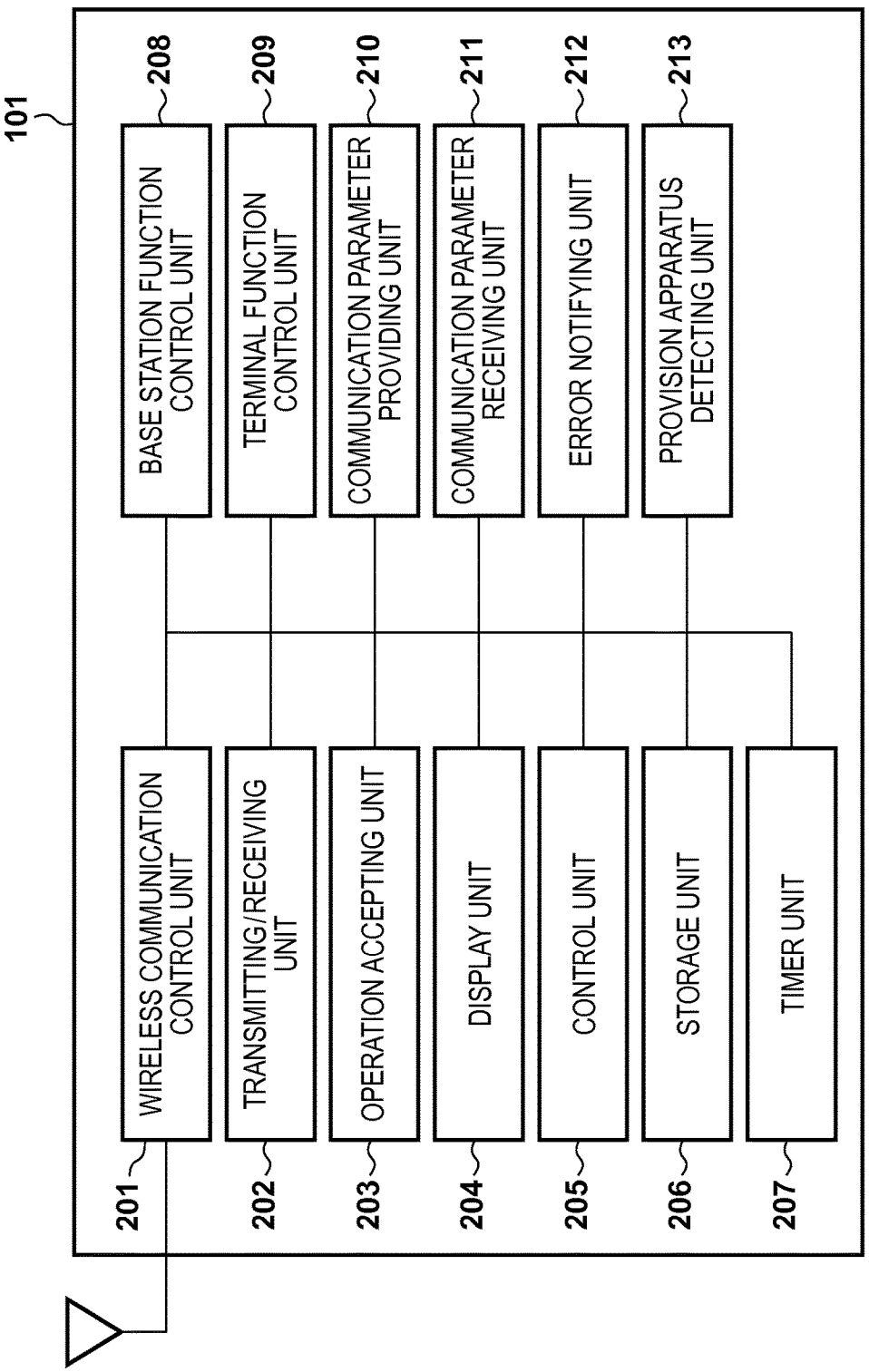
FIG. 2 is a block diagram showing a configuration example of a printer 101.

FIG. 2 shows a functional configuration example of the printer 101 according to the present embodiment. Functional units shown in FIG. 2 are configured by hardware or software, and are interrelated. Also, the functional configuration shown in FIG. 2 is merely an example, and a plurality of functional units may be present as one functional unit, or one functional unit may be divided into a plurality of units.

The printer 101, for example, has functions as a general wireless communication apparatus, such as a wireless communication control unit 201, a transmitting/receiving unit 202, an operation accepting unit 203, a display unit 204, a control unit 205, a storage unit 206, and the like. Also, the printer 101 has a timer unit 207, a base station function control unit 208, a terminal function control unit 209, a communication parameter providing unit 210, a communication parameter receiving unit 211, an error notifying unit 212, and a provision apparatus detecting unit 213.

The wireless communication control unit 201 includes an antenna, a circuit, and the like for transmitting and receiving wireless signals with another wireless apparatus using the wireless LAN, and further includes programs for controlling them and communication. The transmitting/receiving unit 202 controls transmission and reception of data in accordance with the protocol of each communication layer, and performs protocol processing relating to Wi-Fi Direct and WPS.

The operation accepting unit 203 accepts a user operation that is performed by a user on the printer 101. The operation accepting unit 203, for example, includes a setting button and the like that triggers the start of a Group Owner function, the start of processing for setting a communication parameter, and the like. Also, the operation accepting unit 203 may be configured by hardware, or may be configured by any UI generated by software, such as a UI for accepting a selection, made by the user, of an icon output by the display unit 204, or the like. The display unit 204 performs various types of display processing for outputting information that the user can recognize using at least one of visual perception and auditory perception, such as an LCD, an LED, or a speaker.

The control unit 205, for example, is configured by one or a plurality of processors (CPU and the like), and controls the entire printer 101 by executing a control program stored in the storage unit 206. The storage unit 206 is configured to include a ROM that stores programs and data for controlling the printer 101, a RAM that temporarily stores data, and the like. Various actions that will be described later, for example, are performed due to the control unit 205 executing the control program stored in the storage unit 206. The timer unit 207 has a clock function for indicating date, time, and the like, and a measuring function for measuring a predetermined time.

The base station function control unit 208 performs processing according to which the printer 101 operates as the base station in the wireless LAN. The base station function control unit 208 performs control when the printer 101 operates as the P2P GO in Wi-Fi Direct, for example. The terminal function control unit 209 performs processing according to which the printer 101 operates as a terminal station in the wireless LAN. The terminal function control unit 209 performs control when the printer 101 operates as the P2P Client in Wi-Fi Direct, for example.

The communication parameter providing unit 210 provides a communication parameter to the partner device. The later-described communication parameter provision processing is executed by the communication parameter providing unit 210. The communication parameter providing unit 210 executes the communication parameter provision processing in response to reception of a communication parameter provision request from the partner apparatus. Also, an apparatus that provides the communication parameter is referred to as a "Registrar" in the present embodiment.

The communication parameter receiving unit 211 receives the communication parameter from the partner device. It should be noted that because a case in which the printer 101 mainly functions as the registrar will be described in the present embodiment, this functional unit need not be provided. However, in the case where the printer 101 performs communication using the communication parameter provided by another registrar, for example, the communication parameter receiving unit 211 transmits the communication parameter provision request to the registrar, and thereby receives the communication parameter from the registrar.

The error notifying unit 212 transmits a notification signal (packet) indicating that the communication parameter provision processing cannot be executed on the partner apparatus. It should be noted that the error notifying unit 212 may play a role of notifying the user by causing the display unit 204 to display that the communication parameter provision processing cannot be executed. The provision apparatus detecting unit 213 detects whether or not there is a registrar other than the printer 101 while the printer 101 is operating as the registrar.

Processing Flow

Next, a flow of processing executed between the printer 101 and at least one of the mobile phones 104 and 105 and the PC 103 will be described using some examples. It should be noted that it is assumed that hereinafter, the printer 101 functions as the P2P GO, and performs the communication parameter provision processing in each example.

EXAMPLE 1

Figure 3:
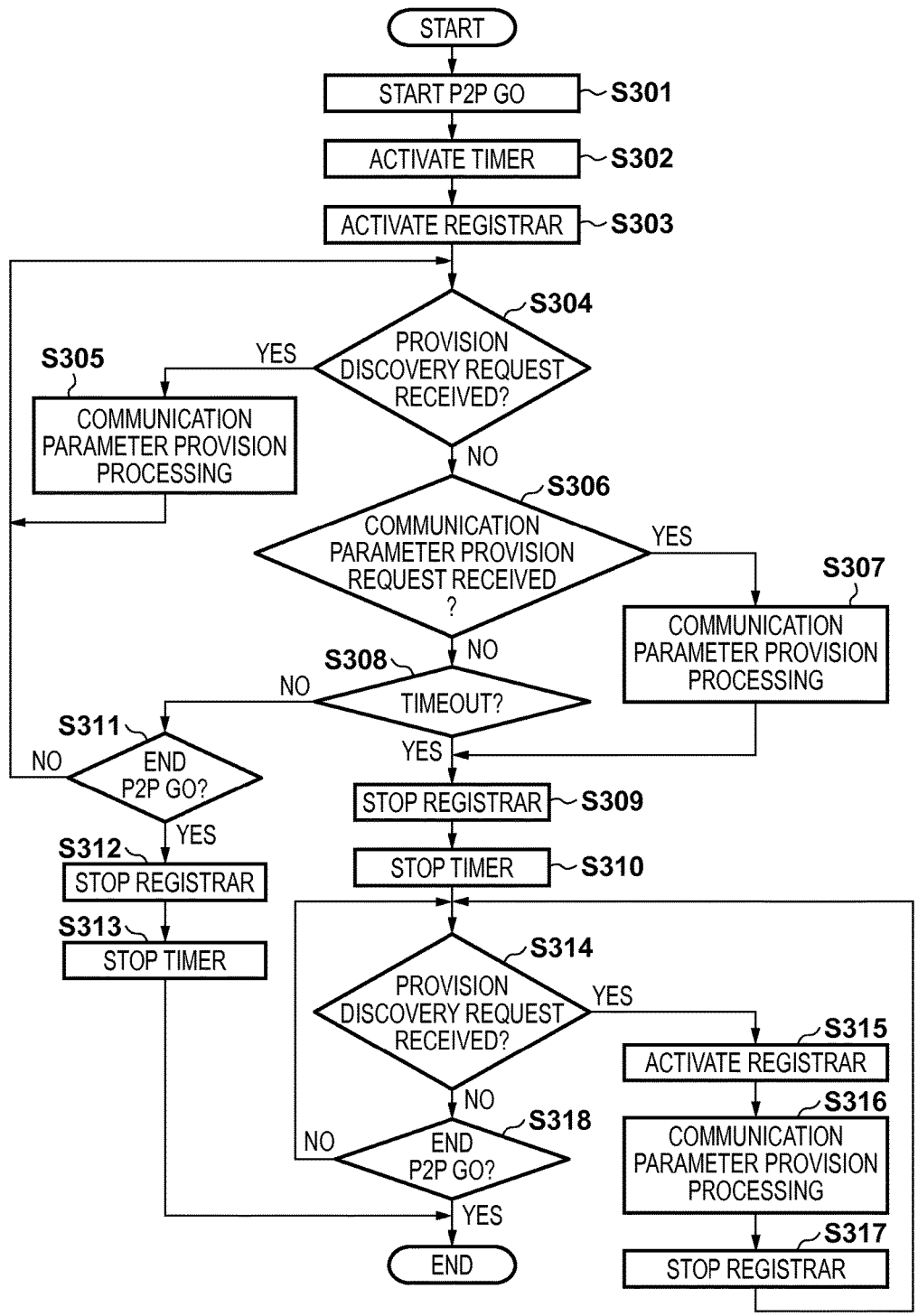
FIG. 3 is a flowchart showing a first example of a flow of processing executed by the printer 101.

FIG. 3 is a flowchart showing an example of the flow of communication parameter provision processing performed by the printer 101. In this example, the operation accepting unit 203 of the printer 101 activates the base station function control unit 208 in response to accepting a start instruction from the user, and starts operation as the P2P GO (step S301). When the printer 101 starts the operation as the P2P GO in step S301, the printer 101 activates the timer unit 207 (step S302), and as the registrar, starts the operation of the communication parameter provision function (step S303). It should be noted that the registrar function activated in step S303 includes a validity time period having a predetermined length of time, and the timer unit 207 is used to determine whether a predetermined time has elapsed since the start of this validity time period. It should be noted that the processing of step S302 and the processing of step S303 may be performed at the same time, or the processing of step S302 may be executed after the processing of step S303 is started, for example.

After starting the operation as the registrar in step S303, the printer 101 determines whether or not the provision discovery request that is a signal from the P2P Client in Wi-Fi Direct has been received by the transmitting/receiving unit 202 (step S304). In the case of receiving the provision discovery request (YES in step S304), the printer 101 performs the communication parameter provision processing on the partner apparatus that has transmitted the provision discovery request (step S305). When the communication parameter provision processing is complete in step S305, the printer 101 once again determines whether or not the provision discovery request was received in step S304. It should be noted that the provision discovery request is an example of a first signal in the present embodiment.

On the other hand, in the case of not receiving the provision discovery request (NO in step S304), the printer 101 determines whether a communication parameter provision request signal, which is not the provision discovery request, has been received (step S306).

Here, in the present embodiment, it is assumed that although this communication parameter provision request signal is an EAPOL-START packet, the communication parameter provision request may be issued by a signal other than this signal. For example, a Probe Request (in which Request Type is Enrollee, that is, the communication parameter receiving apparatus) to which information for searching for an apparatus that provides the communication parameter is added may be used as the communication parameter provision request signal. Also, for example, the communication parameter provision request may be issued as a result of the Request Type of an Association Request being Enrollee. Moreover, the communication parameter provision request may be issued as a result of a Request to Enroll attribute included in the Probe Request being true. It should be noted that the communication parameter provision request signal is an example of a second signal in the present embodiment.

In the case of receiving the EAPOL-START packet (YES in step S306), the printer 101 performs the communication parameter provision processing on the partner apparatus that has transmitted the EAPOL-START packet (step S307). When the communication parameter provision processing is complete in step S307, the printer 101 then stops the operation as the registrar (step S309), and stops the timer unit 207 that has measured activation time of the registrar function (step S310).

On the other hand, in the case of not receiving the EAPOL-START packet (NO in step S306), the printer 101 determines whether the time that has elapsed since activation of the registrar function, that is, since activation of the timer unit 207, has reached a predetermined time (for example, two minutes) (step S308). It should be noted that although the predetermined time is set to two minutes in the present embodiment, the predetermined time is not limited to this, and for example, the predetermined time is determined by the design of the system or the like. Upon determining that the predetermined time has elapsed since activation of the timer unit 207 (YES in step S308), the printer 101 stops the registrar function and the timer unit 207 (steps S309 and S310). It should be noted that a time period during which the registrar function is active, that is, a time period from when the registrar function is activated until the elapse of the predetermined time period (for example, two minutes) is an example of a first time period in the present embodiment.

Upon determining that the predetermined time has not elapsed since activation of the timer unit 207 (NO in step S308), the printer 101 determines whether or not the function as the P2P GO is to be stopped (step S311). The determination of whether or not the function as the P2P GO is to be stopped is performed by determining whether or not an instruction from the user to stop the P2P GO function has been accepted by the operation accepting unit 203. It should be noted that the determination of whether or not the function as the P2P GO is to be stopped may be performed using another factor. For example, in the case where a predetermined time has elapsed during which the P2P Client that connects to the printer 101 is not present, a determination may be made such that the function as the P2P GO is stopped. In the case of determining that the function as the P2P GO is to be stopped (YES in step S311), the printer 101 stops the registrar function and the timer unit 207 (steps S312 and S313) to end the parameter provision processing. On the other hand, in the case of determining that the function as the P2P GO is not to be stopped (NO in step S311), the printer 101 again determines in step S304 whether or not the provision discovery request has been received.

In other words, as long as the printer 101 serves as the P2P GO and does not receive the EAPOL-START packet, in the case where the time since the start of the function as the registrar has reached the predetermined time, the printer 101 stops the function as the registrar. On the other hand, in the case where the communication parameter has been provided by receiving the EAPOL-START packet, the printer 101 stops the function as the registrar even if the time since the start of the function as the registrar has not reached the predetermined time.

After stopping the registrar function and the timer unit 207 in steps S309 and S310, the printer 101 waits to receive the provision discovery request (step S314). Upon receiving the provision discovery request (YES in step S314), the printer 101 then activates the registrar function (step S315), and performs the communication parameter provision processing on the partner apparatus that transmitted the provision discovery request (step S316). Upon completing the communication parameter provision processing in step S316, the printer 101 then stops the registrar function (step S317), and returns to a state of waiting for the provision discovery request in step S314.

In a state in which the printer 101 has not received the provision discovery request (NO in step S314), the printer 101 monitors whether the function as the P2P GO is stopped (step S318). In the case where the function as the P2P GO is not stopped (NO in step S318), the printer 101 then returns to the state of waiting for the provision discovery request performed in step S314. On the other hand, in the case where the function as the P2P GO is to be stopped (YES in step S318), the printer 101 ends the parameter provision processing.

Figure 4:
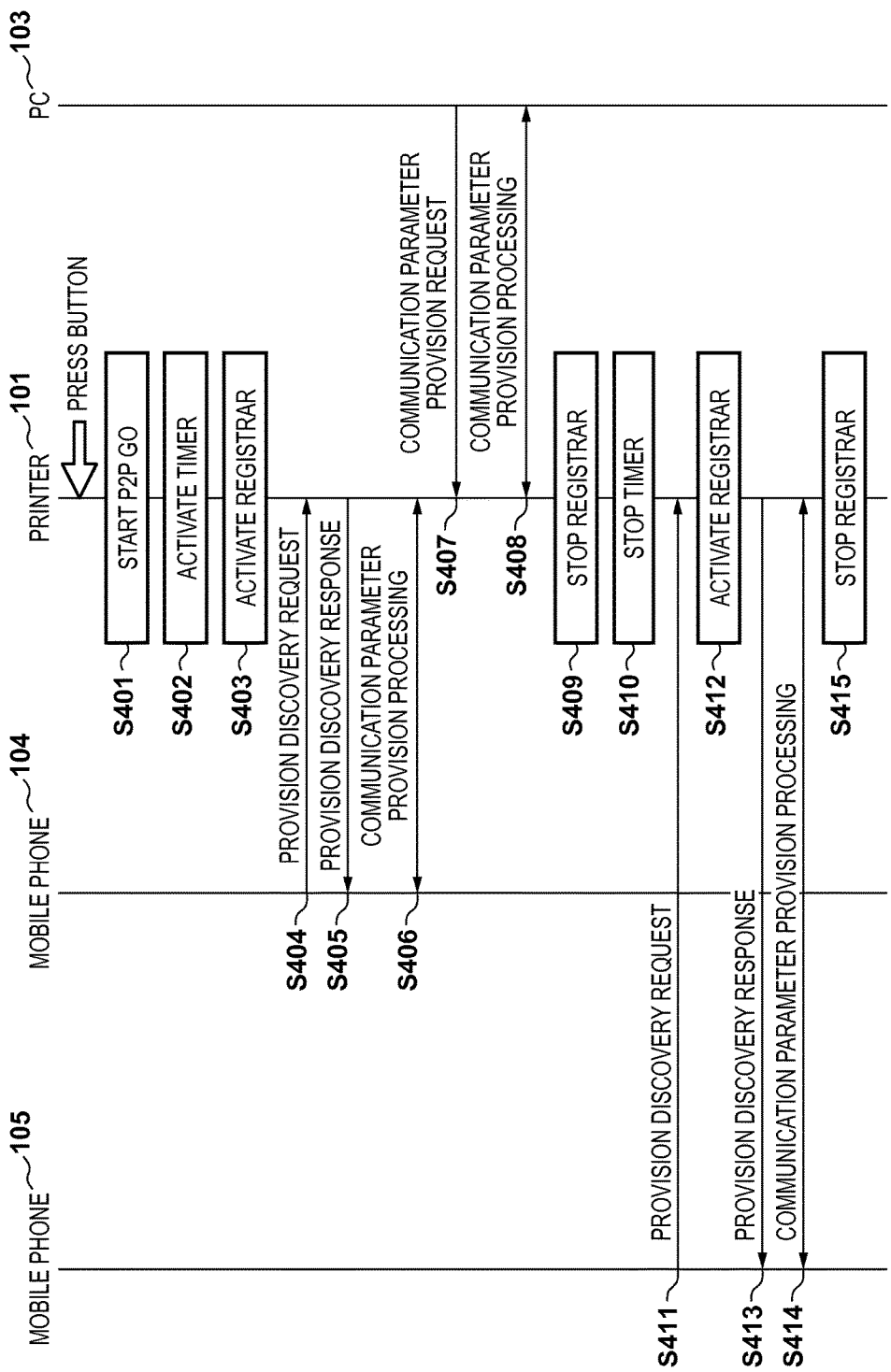
FIG. 4 is a sequence diagram showing the first example of a flow of processing in the wireless communication network.

The flow of processing executed by each device in the wireless communication network at this time will be described. FIG. 4 is a sequence diagram showing the flow of the communication parameter provision processing in the wireless communication network.

When the operation accepting unit 203 accepts an instruction operation from the user, the printer 101 first starts the operation as the P2P GO (step S401), activates the timer (step S402), and then activates the registrar function (step S403). Thereafter, the printer 101 receives the provision discovery request from the mobile phone 104 that requests connection using the Wi-Fi Direct method (step S404). The printer 101 transmits a provision discovery response in response to reception of this provision discovery request (step S405), and performs the communication parameter provision processing on the mobile phone 104 (step S406). It should be noted that in this case, the printer 101 does not stop the registrar function and the timer.

Also, after activating the registrar function in step S403 and before the elapse of a predetermined time, the printer 101 receives the EAPOL-START packet from the PC 103 that requests connection using the PBC method (step S407). In this manner, upon receiving the EAPOL-START packet in a validity time period of the registrar function, the printer 101 performs the communication parameter provision processing (step S408) on the PC 103 that transmitted this EAPOL-START packet. Upon completing the communication parameter provision processing performed in response to the EAPOL-START packet, the printer 101 stops the registrar function and the timer (steps S409 and S410). Also, in the case where a predetermined time has elapsed since activation of the timer in step S402, the printer 101 stops the registrar function and the timer.

Even after stopping the registrar function and the timer, in the case where the signal received from the mobile phone 105 is the provision discovery request (step S411), the printer 101 activates the registrar function (step S412). The printer 101 then transmits the provision discovery response to the mobile phone 105 that has transmitted the provision discovery request (step S413), and then performs the communication parameter provision processing (step S414). Upon completing the communication parameter provision processing in step S414, the printer 101 stops the registrar function (step S415). It should be noted that for example, in the case where the signal received from the mobile phone 105 is the EAPOL-START packet, the printer 101 does not perform the communication parameter provision processing on the mobile phone 105 because the registrar function is not activated at this time.

In this manner, even if the instruction operation from the user is not accepted, the printer 101 that serves as the P2P GO can provide the communication parameter to the partner apparatus that uses the Wi-Fi Direct method or the PBC method as a connection method. In addition, also after the communication parameter provision using the PBC method is complete or after a predetermined time has elapsed, the printer 101 can provide the communication parameter without accepting the instruction operation from the user to the partner apparatus that uses the Wi-Fi Direct method as the connection method. It should be noted that even after the communication parameter provision using the PBC method is complete or after a predetermined time has elapsed, in the case where the user has performed an instruction operation for connection using the PBC method, the printer 101 can activate the registrar function to provide the communication parameter.

Next, an example of operations performed in a case where the user presses a button for connection using the PBC method immediately before the elapse of a predetermined time since activation of the timer so as to instruct the printer 101 to perform the communication parameter provision processing will be described using FIG. 5. There may be a case in which the communication parameter provision processing is not executed in the case where the user requests connection using the PBC method, for example, immediately before the elapse of the predetermined time, because the printer 101 stops the registrar function upon the elapse of the predetermined time after the registrar function is activated.

In view of this, in the case of accepting the instruction for connection using the PBC method from the user before the elapse of the predetermined time, the printer 101 re-activates the timer. Accordingly, the printer 101 can match a time period in which processing for connection using the PBC method can be executed to a time period expected by the user, and thus, can provide the communication parameter as the user expects.

Figure 5:
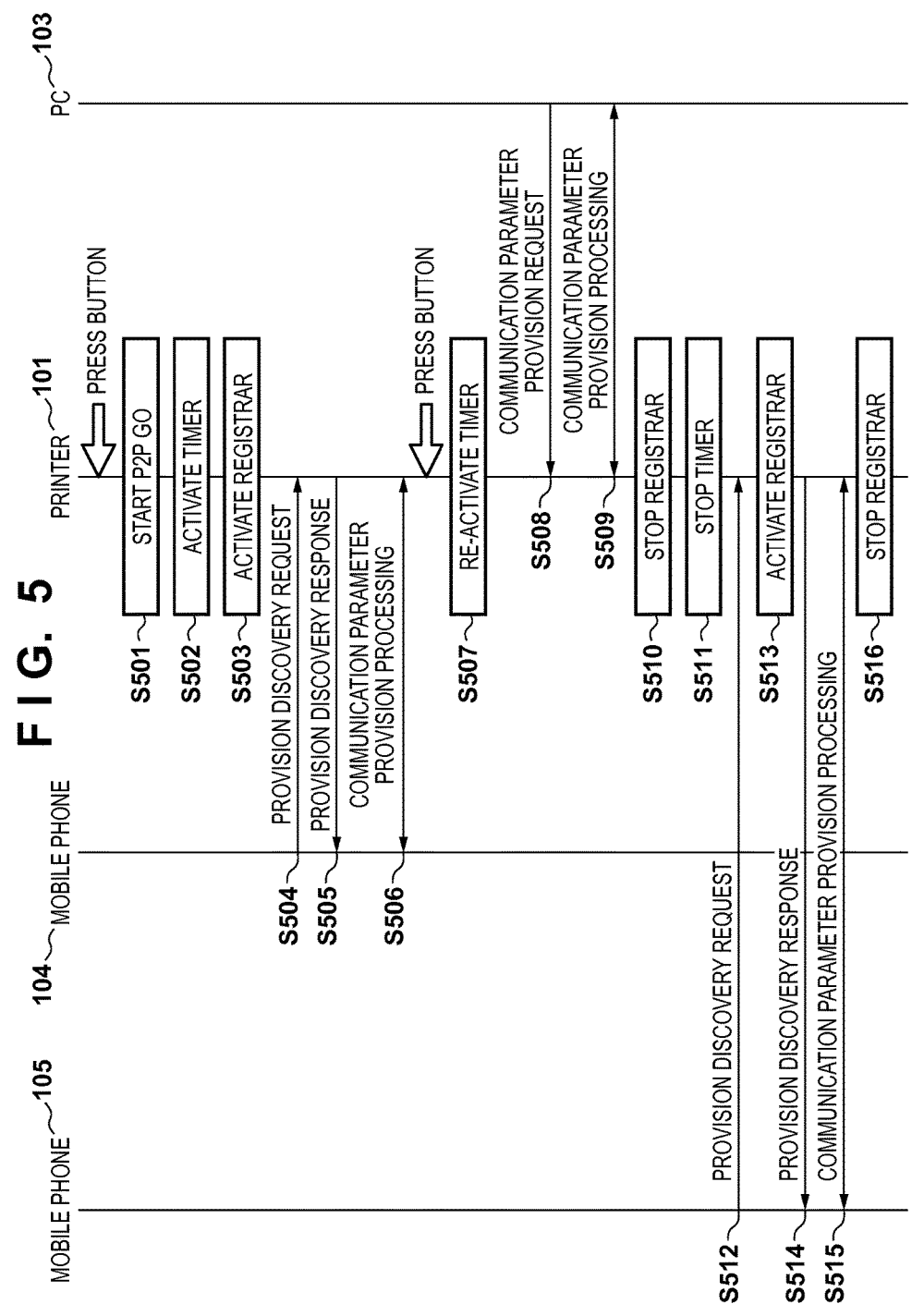

FIG. 5 is a sequence diagram showing the communication parameter provision processing in the wireless communication network in such a case. Because the processing from step S501 to step S506 and the processing from step S511 to step S516 in FIG. 5 are the same as the processing from step S401 to step S406 and the processing from step S410 to step S415 in FIG. 4, description thereof is omitted.

In FIG. 5, it is assumed that after performing the communication parameter provision processing on the mobile phone 104 in step S506, the printer 101 accepts an instruction for the communication parameter provision processing using the PBS method from the user. In this case, the printer 101 re-activates the timer unit 207 (step S507). Specifically, the printer 101 resets the time measured by the timer unit 207 (for example, sets it to 0), and then the timer unit 207 measures the time starting from when the timer unit is re-activated. In this case, the printer 101 ends the function as the registrar when the time that has elapsed since re-activation reaches a predetermined time or the communication parameter is provided using the EAPOL-START packet. In FIG. 5, upon receiving the communication parameter request from the PC 103 (step S508) after the timer is re-activated in step S507 and before the elapse of the predetermined time, the printer 101 performs the communication parameter provision processing on the PC 103 (step S509). After the communication parameter provision processing is complete, the printer 101 then stops the registrar function (step S510).

It should be noted that although not shown in FIG. 5, while the communication parameter provision processing is being executed on the mobile phone 104 (step S506), the printer 101 may inactivate the start instruction button via the operation accepting unit 203, and activate the button after the provision processing is complete, although this is not shown in FIG. 5. Also, during a time period of inactivation, the printer 101 may cause the display unit 204 to display the progress status of the communication parameter provision processing so as to perform notification of the terminal on which the provision processing is being executed to the user.

In this manner, the printer 101 re-activates the timer if the instruction for the communication parameter provision processing using the PBC method is accepted from the user before the elapse of the predetermined time since activation of the timer. Accordingly, it is possible to match a time period in which the communication parameter provision using the PBC method can be executed to a time period expected by the user.

EXAMPLE 2

Figure 6:
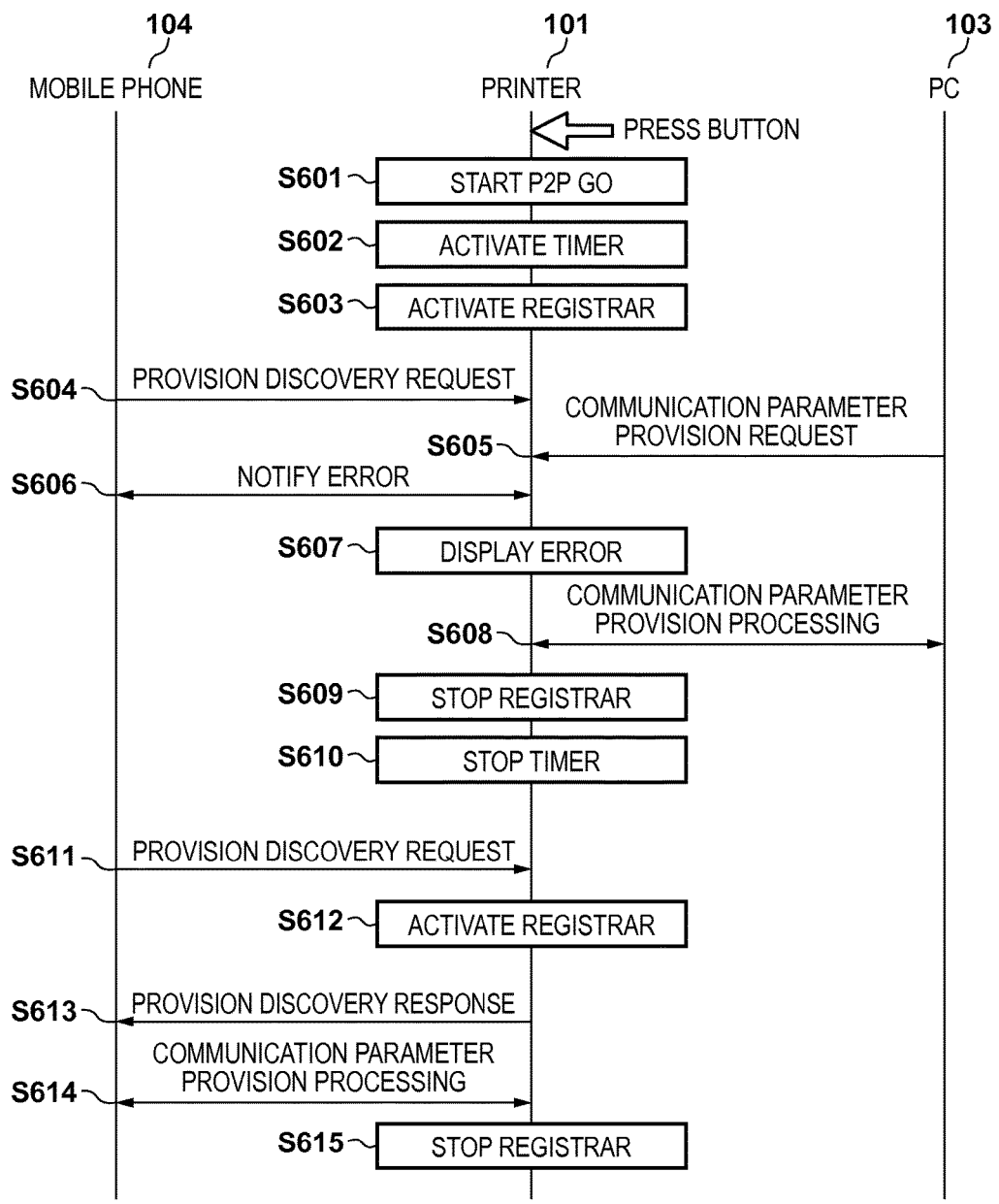
FIG. 6 is a sequence diagram showing a third example of a flow of processing in the wireless communication network.

In this example, a flow of processing performed in a case of receiving the communication parameter provision request from the PC 103 as well before responding to the communication parameter provision request from the mobile phone 104 will be described. FIG. 6 shows the flow of communication parameter provision processing in a wireless communication network according to this example. It should be noted that because the processing from step S601 to step S604 in FIG. 6 is the same as the processing from step S401 to step S404, description thereof is omitted.

In this example, the printer 101 receives a provision discovery request in step S604, and before transmitting a provision discovery response to the mobile phone 104, the printer 101 receives an EAPOL-START packet that is intended for a communication parameter request from the PC 103 (step S605). Then, the printer 101 notifies the mobile phone 104 of an error indicating that the communication parameter cannot be provided via the error notifying unit 212 (step S606). This error may be explicitly notified using an error code, may be notified using a response that does not include information that is to be included at the time of acknowledgement, or may be notified by not transmitting a response.

After notifying the mobile phone 104 of the error in step S606, the printer 101 may display an error indicating that the printer 101 cannot connect to the mobile phone 104 on the display unit 204 (step S607). Here, if the provision discovery request received in step S604 includes identification information such as a device name of the mobile phone 104 or the like, the printer 101 may cause the display unit 204 to display the device name corresponding to the identification information along with the error. It should be noted that the printer 101 may be configured to perform error display on the display unit 204 in step S607, and to not notify the mobile phone 104 of the error in step S606. In other words, the printer 101 can be configured to perform at least one of error display and error notification to another apparatus. Also, the printer 101 may display an error on the display unit 204 and then notify the mobile phone 104 of the error.

The printer 101 does not provide the communication parameter to the mobile phone 104 due to the error, whereas the printer 101 provides the communication parameter to the PC 103 that has requested the communication parameter provision using the PBC method (step S608). When the communication parameter provision processing for the PC 103 ends, the printer 101 then stops the registrar function and the timer (steps S609 and S610). Thereafter, in response to re-reception of the provision discovery request (step S611) from the mobile phone 104, the printer 101 executes the communication parameter provision processing on the mobile phone 104 (steps S612 to S615). It should be noted that the processing of steps S612 to S615 is similar to that of steps S411 to S414 in FIG. 4 except that the mobile phone 104 is a requestor and a destination for the communication parameter instead of the mobile phone 105, and therefore detailed description is omitted.

In the case of the elapse of a predetermined time since the printer 101 started operation as the P2P GO, in order to request the communication parameter provision using the PBC method, the user needs to perform an instruction operation for the provision on the printer 101 using the PBC method. On the other hand, in the case of requesting the communication parameter using the Wi-Fi Direct method, the user does not need to perform the instruction operation on the printer 101 even after the elapse of a predetermined time since the printer 101 started the operation as the P2P GO. In contrast, in this example, in the case of receiving the provision request using the Wi-Fi Direct method and the provision request using the PBC method at approximately the same time, the printer 101 gives priority to the partner apparatus that transmitted the provision request using the PBC method, and provides the communication parameter thereto. Accordingly, it is possible to increase the probability that the printer 101 can provide the communication parameter to the partner apparatus that transmitted the provision request using the PBC method before the elapse of a predetermined time since the printer 101 started the operation as the P2P GO. Also, the printer 101 can reliably provide the communication parameter to the partner apparatus that requests the communication parameter using the Wi-Fi Direct method by constructing a system such that the partner apparatus re-transmits the request.

EXAMPLE 3

Figure 7:
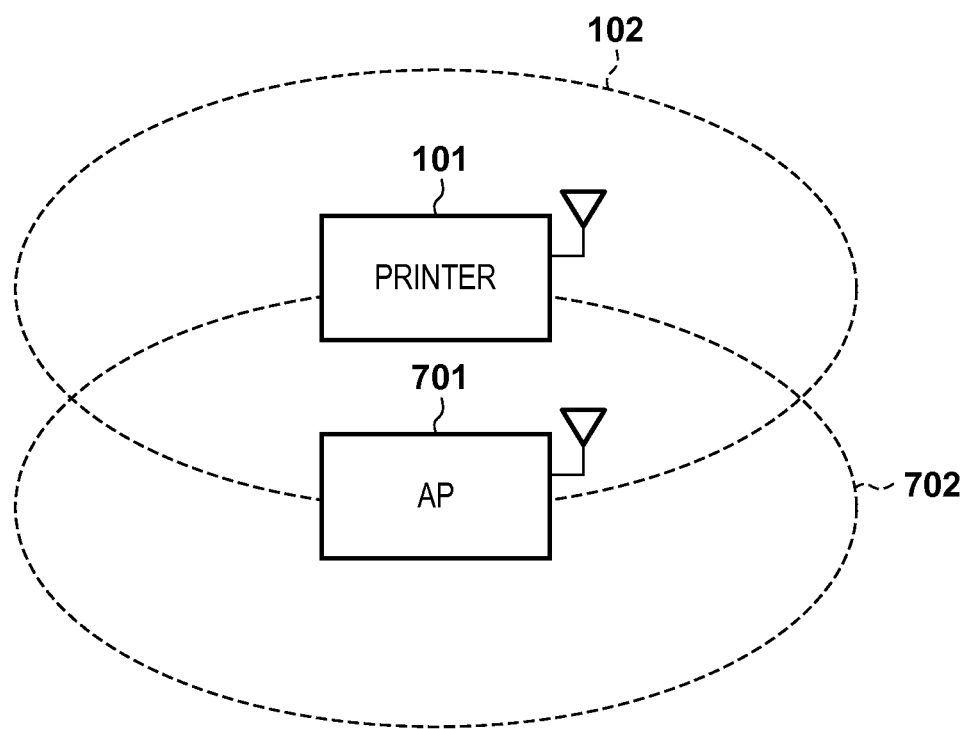
FIG. 7 is a conceptual diagram showing a state in which there are a plurality of communication apparatuses functioning as registrars.

As shown in FIG. 7, in the actual environment, there may be a case where an access point (AP) 701 of a wireless LAN having a registrar function for providing a communication parameter is in the vicinity of the printer 101. It should be noted that it is assumed that the access point 701 forms a wireless network 702. In this case, the access point 701 may also operate as a registrar while the printer 101 is operating as the registrar function. In other words, session overlap may occur due to there being a plurality of registrars. In this example, processing performed in a case where this session overlap occurs will be described.

Figure 8A:
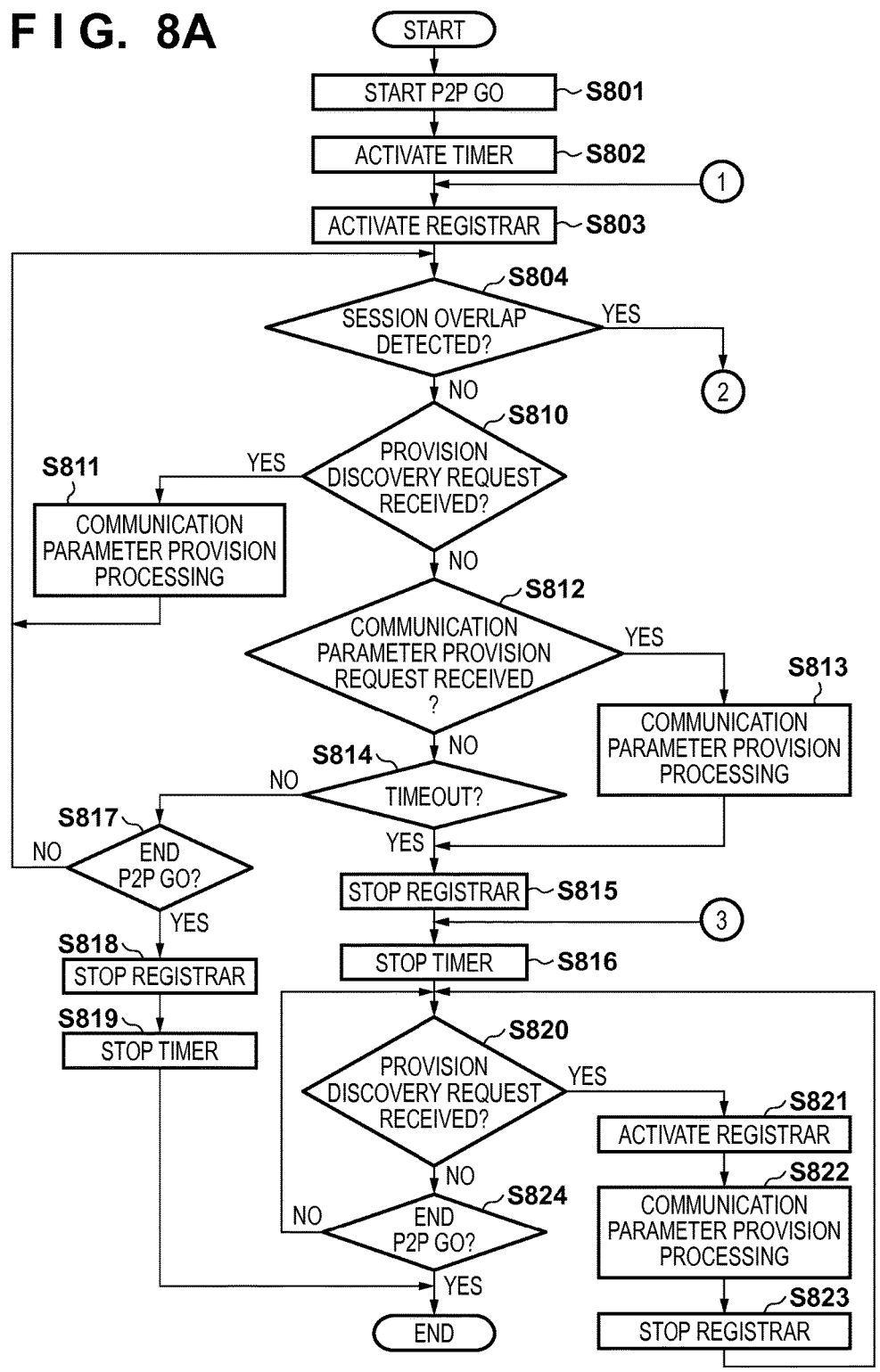
FIGS. 8A and 8B are flowcharts showing a second example of a flow of processing executed by the printer 101.
Figure 8B:
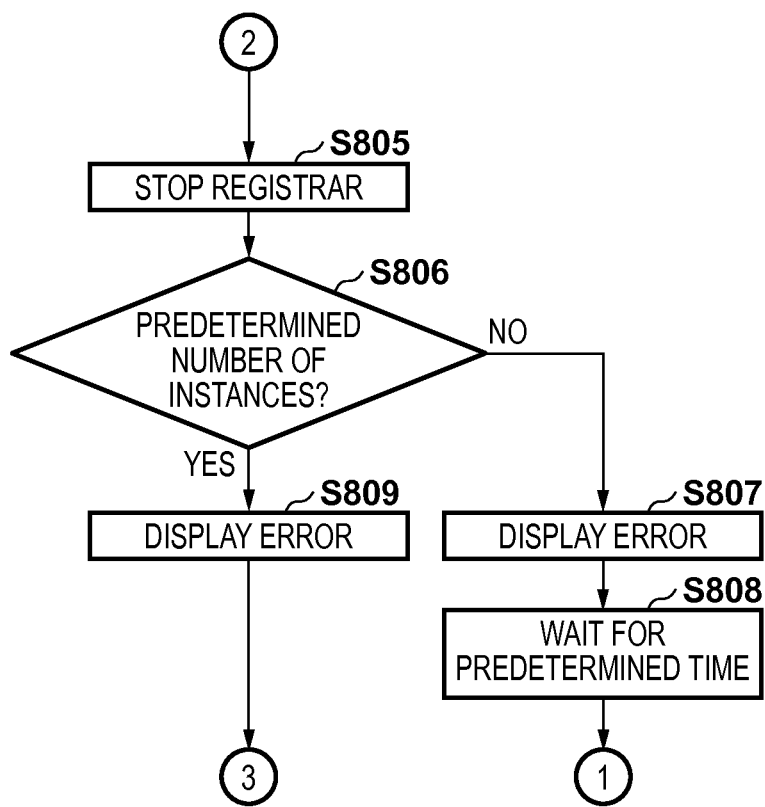

FIGS. 8A and 8B are flowcharts showing an example of a flow of communication parameter provision processing performed by the printer 101 in this example. Because the processing of steps S801 to S803 and the processing of steps S810 to S824 in FIG. 8A are respectively similar to the processing of steps S301 to S303 and the processing of steps S304 to S318 in FIG. 3, description thereof is omitted.

After starting the operation as the registrar in step S803, the printer 101 uses the provision apparatus detecting unit 213 to perform processing for detecting whether or not there is another communication apparatus that operates as the registrar (step S804). In the case where another communication apparatus that operates as the registrar is not detected (NO in step S804), the printer 101 then moves the processing to step S810, and executes processing similar to that of steps S304 to S318 in FIG. 3. On the other hand, in the case where another communication apparatus that operates as the registrar is detected (YES in step S804), the printer 101 stops the operation of the printer 101 as the registrar (step S805). Thereafter, the printer 101 determines whether or not the number of instances of detecting another communication apparatus that operates as the registrar has reached a predetermined number of instances (step S806) without performing the communication parameter provision processing. The predetermined number of instances, for example, is three, but this value may be set to any number according to the system configuration, for example. In the case where the number of instances of detection has not reached a predetermined number of instances (NO in step S806), the printer 101 displays on the display unit 204 an error indicating that a connection request is to be issued after waiting for a predetermined time period (step S807), and then the printer 101 waits for a predetermined time (step S808). Although the predetermined time is 30 seconds, for example, another value may be used. Thereafter, after waiting for the predetermined time period in step S808, the printer 101 restarts the operation as the registrar (step S803). On the other hand, in the case where it is determined that the number of instances of detection has reached the predetermined number of instances (YES in step S806), the printer 101 displays an error indicating that the operation as the registrar is to be stopped on the display unit 204 (step S809), and stops the timer (step S816).

In this manner, in the case where another communication apparatus that operates as the registrar is detected, the printer 101 stops the operation as the registrar. The printer 101 then restarts the operation as the registrar after waiting for only the predetermined time period. Thus, the printer 101 can perform the communication parameter provision processing by itself without interrupting processing for another communication apparatus providing the communication parameter as the registrar.

It should be noted that the above-described processing may be processing that is executed only in a case where the printer 101 operates as an Autonomous GO. In other words, the above-described processing may be processing that is executed only in a case where the printer 101 operates in an operation mode in which the printer 101 necessarily serves as the P2P GO without exchanging an intent value with a partner apparatus in order to operate as the P2P GO. Therefore, in the case where it has been decided that the printer 101 operates as the P2P GO as a result of exchanging the intent values with the partner apparatus, it is possible to not execute the above-described processing even though the printer 101 similarly operates as the P2P GO.

Also, although the processing performed in the case where the printer 101 functions as the P2P GO was described in the above-described examples, the printer 101 may function as the base station in the infrastructure mode instead of the P2P GO to execute the communication parameter provision processing. Also, in the case of failing to perform the communication parameter provision processing in the above-described examples, the printer 101 may display an error indicating that the communication parameter provision processing failed on the display unit 204. Also, in the case of failing to perform the communication parameter provision processing using the PBC method, the printer 101 may re-execute the communication parameter provision processing as long as the failure occurs within a predetermined time since the timer was activated.

Furthermore, although there is no limitation on the number of partner devices connected to the printer 101 in the above-described examples, it is possible to provide an upper limit value to the number of connected devices. The upper limit of the number of connected devices may be limited to, for example, five. Also, in the case where the number of connected partner apparatuses has reached the upper limit value, the printer 101 may display an error indicating that the number of connected apparatuses has reached the upper limit value on the display unit 204. Also, upon receiving the provision discovery request, the printer 101 executes the communication parameter provision processing on the partner apparatus that has requested connection using the Wi-Fi Direct method in the above-described examples, but the present invention is not limited to this. For example, the printer 101 may execute the communication parameter provision processing upon receiving a probe request to which identification information according to which it can be understood that the Wi-Fi Direct function is supported is added.

According to the present invention, a communication apparatus can easily execute provision of a communication parameter, regardless of the format of a communication parameter request from the partner apparatus.

OTHER EMBODIMENTS

An embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of the above-described embodiment and/or that includes one or more circuits (e.g., application specific integrated circuit (ASIC)) for performing the functions of the above-described embodiment, and by a method performed by the computer of the system or apparatus by, for example, reading out and executing the computer executable instructions from the storage medium to perform the functions of the above-described embodiment and/or controlling the one or more circuits to perform the functions of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2014-102730, filed May 16, 2014, which is hereby incorporated by reference herein in its entirety.

What is claimed is:

1. A communication apparatus, comprising:
   at least one processor; and
   at least one memory storing instructions that, when executed by the at least one processor, cause the at least one processor to function as:
     an accepting unit configured to accept a start instruction for starting a predetermined wireless communication protocol;
     a providing unit configured to provide a communication parameter for wireless communication;
     a receiving unit configured to receive an activation request signal for requesting activation of the providing unit, which is compliant with the predetermined wireless communication protocol;
     an activation unit configured to activate the providing unit in response to receiving the activation request signal; and
     a control unit configured to execute a control such that the providing unit provides the communication parameter to another communication apparatus even if the activation request signal is not received from the another communication apparatus in a case where a request signal for a communication parameter is received from the another communication apparatus within a predetermined time from when the start instruction is accepted by the accepting unit,
     wherein the control unit executes a control such that, after elapse of the predetermined time, the providing unit does not provide the communication parameter in a state where the activation request signal has not been received even if the request signal for a communication parameter is received and the providing unit does provide the communication parameter if the activation request signal is received, and
     wherein the providing unit provides the communication parameter to a second other communication apparatus in response to, before the elapse of the predetermined time and before providing a first other communication apparatus with the communication parameter:
       the activation request signal being received from the first other communication apparatus, and
       the request signal for a communication parameter being received from the second other communication apparatus.

2. The communication apparatus according to claim 1, wherein the at least one memory further stores instructions that, when executed by the at least one processor, cause the at least one processor to function as:
   an ending unit configured to end measurement of the predetermined time in response to the communication apparatus stopping the predetermined communication protocol.

3. The communication apparatus according to claim 1, wherein the at least one memory further stores instructions that, when executed by the at least one processor, cause the at least one processor to function as:
   an ending unit configured to end measurement of the predetermined time in response to reception of the request signal for a communication parameter.

4. The communication apparatus according to claim 1, wherein the at least one memory further stores instructions that, when executed by the at least one processor, cause the at least one processor to function as:
   a notifying unit configured to notify a user of the communication apparatus that the communication parameter is not to be provided to the first other communication apparatus.

5. The communication apparatus according to claim 1, wherein the first other communication apparatus is notified that the communication parameter is not to be provided to the first other communication apparatus, by not transmitting a response to the activation request signal from the first other communication apparatus.

6. The communication apparatus according to claim 1, wherein the at least one memory further stores instructions that, when executed by the at least one processor, cause the at least one processor to function as:
   a transmitting unit configured to transmit, to the first other communication apparatus, a notification signal notifying that the communication parameter is not to be provided to the first other communication apparatus.

7. The communication apparatus according to claim 1, wherein the at least one memory further stores instructions that, when executed by the at least one processor, cause the at least one processor to function as:
   a detecting unit configured to detect another apparatus that provides a communication parameter,
   wherein the providing unit stops provision of a communication parameter in response to the detecting unit detecting another apparatus.

8. The communication apparatus according to claim 7, wherein the providing unit restarts provision of a communication parameter after waiting for a second predetermined time since the provision of the communication parameter has been stopped.

9. The communication apparatus according to claim 8, wherein the at least one memory further stores instructions that, when executed by the at least one processor, cause the at least one processor to function as:
  a displaying unit configured to cause an error to be displayed in a case where the number of instances of stopping provision of the communication parameter reaches a predetermined number of instances without a communication parameter being provided.

10. The communication apparatus according to claim 1, wherein the activation request signal is a provision discovery request in Wi-Fi Direct.

11. The communication apparatus according to claim 1, wherein the request signal for a communication parameter is an EAPOL-START packet.

12. A method for controlling a communication apparatus having an accepting unit configured to accept a start instruction for starting a predetermined wireless communication protocol, a providing unit configured to provide a communication parameter for wireless communication, a receiving unit configured to receive an activation request signal for requesting activation of the providing unit, which is compliant with the predetermined wireless communication protocol, and an activation unit configured to activate the providing unit in response to receiving the activation request signal, the method comprising:
  executing a control such that the providing unit provides the communication parameter to another communication apparatus even if the activation request signal is not received from the another communication apparatus in a case where a request signal for a communication parameter is received from the another communication apparatus within a predetermined time from when the start instruction is accepted by the accepting unit, and
  executing a control such that, after elapse of the predetermined time, the providing unit does not provide the communication parameter in a state where the activation request signal has not been received even if the request signal for a communication parameter is received and the providing unit does provide the communication parameter if the activation request signal is received,
  wherein the providing unit provides the communication parameter to a second other communication apparatus in response to, before the elapse of the predetermined time and before providing a first other communication apparatus with the communication parameter:
    the activation request signal being received from the first other communication apparatus, and
    the request signal for a communication parameter being received from the second other communication apparatus.

13. A non-transitory computer-readable storage medium storing a computer program for causing a computer included in a communication apparatus having an accepting unit configured to accept a start instruction for starting a predetermined wireless communication protocol, a providing unit configured to provide a communication parameter for wireless communication, a receiving unit configured to receive an activation request signal for requesting activation of the providing unit, which is compliant with the predetermined wireless communication protocol, and an activation unit configured to activate the providing unit in response to receiving the activation request signal to:
  execute a control such that the providing unit provides the communication parameter to another communication apparatus that transmitted the activation request signal after the providing unit is activated by the activation unit, and that the providing unit provides the communication parameter to another communication apparatus even if the activation request signal is not received from the another communication apparatus in a case where a request signal for a communication parameter is received from the another communication apparatus within a predetermined time from when the start instruction is accepted by the accepting unit, and
  execute a control such that, after elapse of the predetermined time, the providing unit does not provide the communication parameter in a state where the activation request signal has not been received even if the request signal for a communication parameter is received and the providing unit does provide the communication parameter if the activation request signal is received,
  wherein the providing unit provides the communication parameter to a second other communication apparatus in response to, before the elapse of the predetermined time and before providing a first other communication apparatus with the communication parameter:
    the activation request signal being received from the first other communication apparatus, and
    the request signal for a communication parameter being received from the second other communication apparatus.

* * * * *